United States Patent
Mohs et al.

(10) Patent No.: US 8,146,375 B2
(45) Date of Patent: Apr. 3, 2012

(54) HYDROCOOLER WITH THERMAL STORAGE

(75) Inventors: William F. Mohs, Minneapolis, MN (US); B. Wayne Benson, Eden Prairie, MN (US); Vidhey V. Trivedi, Maharashrta (IN)

(73) Assignee: Thermo King Corporation, Minneapolis, MN (US)

( * ) Notice: Subject to any disclaimer, the term of this patent is extended or adjusted under 35 U.S.C. 154(b) by 556 days.

(21) Appl. No.: 12/401,221

(22) Filed: Mar. 10, 2009

(65) Prior Publication Data

US 2010/0229576 A1 Sep. 16, 2010

(51) Int. Cl.
*F25B 41/00* (2006.01)
(52) U.S. Cl. .......................... 62/113; 62/435
(58) Field of Classification Search .............. 62/435, 62/305, 113, 119, 118, 310, 513; 261/151, 261/152; 165/62, 902
See application file for complete search history.

(56) References Cited

U.S. PATENT DOCUMENTS

| | | | |
|---|---|---|---|
| 2,506,775 A | 5/1950 | Calabrese | |
| 3,440,831 A | 4/1969 | Thompson | |
| 3,498,208 A | 3/1970 | Longe et al. | |
| 3,831,389 A | 8/1974 | Lipona | |
| 4,406,138 A * | 9/1983 | Nelson | 62/305 |
| 4,434,623 A | 3/1984 | Weasel, Jr. | |
| 4,467,612 A | 8/1984 | Weasel, Jr. | |
| 4,532,774 A | 8/1985 | Burns | |
| 4,567,010 A | 1/1986 | Hutton et al. | |
| 4,598,555 A | 7/1986 | Windecker | |
| 4,707,307 A | 11/1987 | Hutton et al. | |
| 4,940,079 A * | 7/1990 | Best et al. | 165/236 |
| 4,964,279 A | 10/1990 | Osborne | |
| 5,054,291 A | 10/1991 | Davis et al. | |
| 5,130,152 A | 7/1992 | Alameda | |
| 5,170,698 A | 12/1992 | Kirk | |
| 5,196,222 A | 3/1993 | Kirk | |
| 5,218,826 A | 6/1993 | Kirschner et al. | |
| 5,231,921 A | 8/1993 | Kirk | |
| 5,246,061 A | 9/1993 | Zalite | |
| 5,259,214 A * | 11/1993 | Nagatomo et al. | 62/324.1 |
| 5,312,034 A | 5/1994 | Nakagawa et al. | |
| 5,318,789 A | 6/1994 | Nakagawa et al. | |
| 5,423,191 A | 6/1995 | Bennett | |
| 5,544,487 A | 8/1996 | Attey et al. | |
| 5,565,230 A | 10/1996 | Bailey | |
| 5,653,111 A | 8/1997 | Attey et al. | |
| 6,158,499 A | 12/2000 | Rhodes et al. | |
| 6,202,434 B1 | 3/2001 | Hearne, Jr. | |
| 6,227,002 B1 | 5/2001 | Bianco et al. | |
| 6,253,567 B1 * | 7/2001 | Imanari et al. | 62/434 |
| 6,418,728 B1 * | 7/2002 | Monroe | 62/3.2 |
| 6,453,693 B1 * | 9/2002 | Ewert et al. | 62/236 |
| 6,457,402 B1 | 10/2002 | Parker et al. | |
| 6,460,352 B1 | 10/2002 | Lemcoff et al. | |
| 6,469,487 B2 * | 10/2002 | Ewert et al. | 62/228.4 |
| 6,615,908 B1 | 9/2003 | Bosher et al. | |
| 6,923,111 B2 | 8/2005 | Kiefer et al. | |
| 7,836,714 B2 * | 11/2010 | Carlson et al. | 62/183 |
| 7,980,093 B2 * | 7/2011 | Kuehl et al. | 62/435 |
| 2005/0247072 A1 * | 11/2005 | Narayanamurthy et al. | 62/222 |
| 2006/0037329 A1 | 2/2006 | Narayanamurthy | |
| 2006/0070385 A1 | 4/2006 | Narayanamurthy et al. | |

* cited by examiner

*Primary Examiner* — Mohammad Ali
(74) *Attorney, Agent, or Firm* — Michael Best & Friedrich LLP

(57) ABSTRACT

A hydrocooler system for cooling produce. The hydrocooler system comprises a hydrocooler tank configured to contain a fluid used to saturate and cool the produce, and a thermal storage device positioned in the hydrocooler tank and configured to receive a refrigerant. The thermal storage device is configured to generate a thermal storage medium from the fluid on the thermal storage device in response to the flow of refrigerant through the thermal storage device.

19 Claims, 4 Drawing Sheets

HYDROCOOLER WITH THERMAL STORAGE

BACKGROUND

The present invention relates to a hydrocooler system for cooling produce. More particularly, the present invention relates to a modular hydrocooler system including a thermal storage device for cooling a fluid used to cool the produce.

Hydrocoolers are commonly used to cool produce immediately after harvesting so as to provide the highest quality produce to consumers. In some instances, quickly cooling the product dramatically improves the shelf life of the produce.

SUMMARY

The invention provides a hydrocooler system for cooling produce. The hydrocooler system includes a hydrocooler tank configured to contain a fluid used to saturate and cool the produce, and a thermal storage device positioned in the hydrocooler tank and configured to receive a refrigerant. The thermal storage device is configured to generate a thermal storage medium from the fluid on the thermal storage device in response to the flow of refrigerant through the thermal storage device.

The invention further provides a hydrocooler system for cooling produce. The hydrocooler system includes a hydrocooler tank configured to contain a fluid used to saturate and cool produce, an evaporator fluidly connected to the hydrocooler tank and configured to be in thermal communication with the fluid, and a thermal storage device fluidly connected to the hydrocooler tank and to the evaporator such that the hydrocooler tank, the evaporator, and the thermal storage device are fluidly connected in series with one another. The thermal storage device is configured to receive a refrigerant and configured to be in thermal communication with the fluid. The hydrocooler system further includes a condensing unit configured to supply the refrigerant to the thermal storage device and to the evaporator. The refrigerant is operable to remove heat from the fluid during a first mode of operation and a second mode of operation. During the first mode of operation the condensing unit supplies the refrigerant to the evaporator to remove heat from the fluid and during the second mode of operation the condensing unit supplies the refrigerant to the thermal storage device to generate a thermal storage medium from the fluid on the thermal storage device in response to removing heat from the fluid.

The invention further provides a method of cooling produce. The method includes positioning a hydrocooler tank, an evaporator and a thermal storage device in series and in fluid communication with one another, and circulating fluid from the hydrocooler tank, to the evaporator, then to the thermal storage device and back to the hydrocooler tank. The evaporator and the thermal storage device are in thermal communication with the fluid. The fluid from within the hydrocooler tank is used to cool produce. The method further includes generating a thermal storage medium on the thermal storage device from the fluid in response to the thermal storage device receiving the supply of the refrigerant during the second mode of operation. The refrigerant is operable to remove heat from the fluid circulated to the thermal storage device. The method further includes supplying refrigerant from a condensing unit to the evaporator in a first mode of operation and to the thermal storage device in a second mode of operation, and directing the fluid to the evaporator to remove heat from the fluid and then directing the fluid to the thermal storage device to directly contact the thermal storage medium to remove heat from the fluid in the first mode of operation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
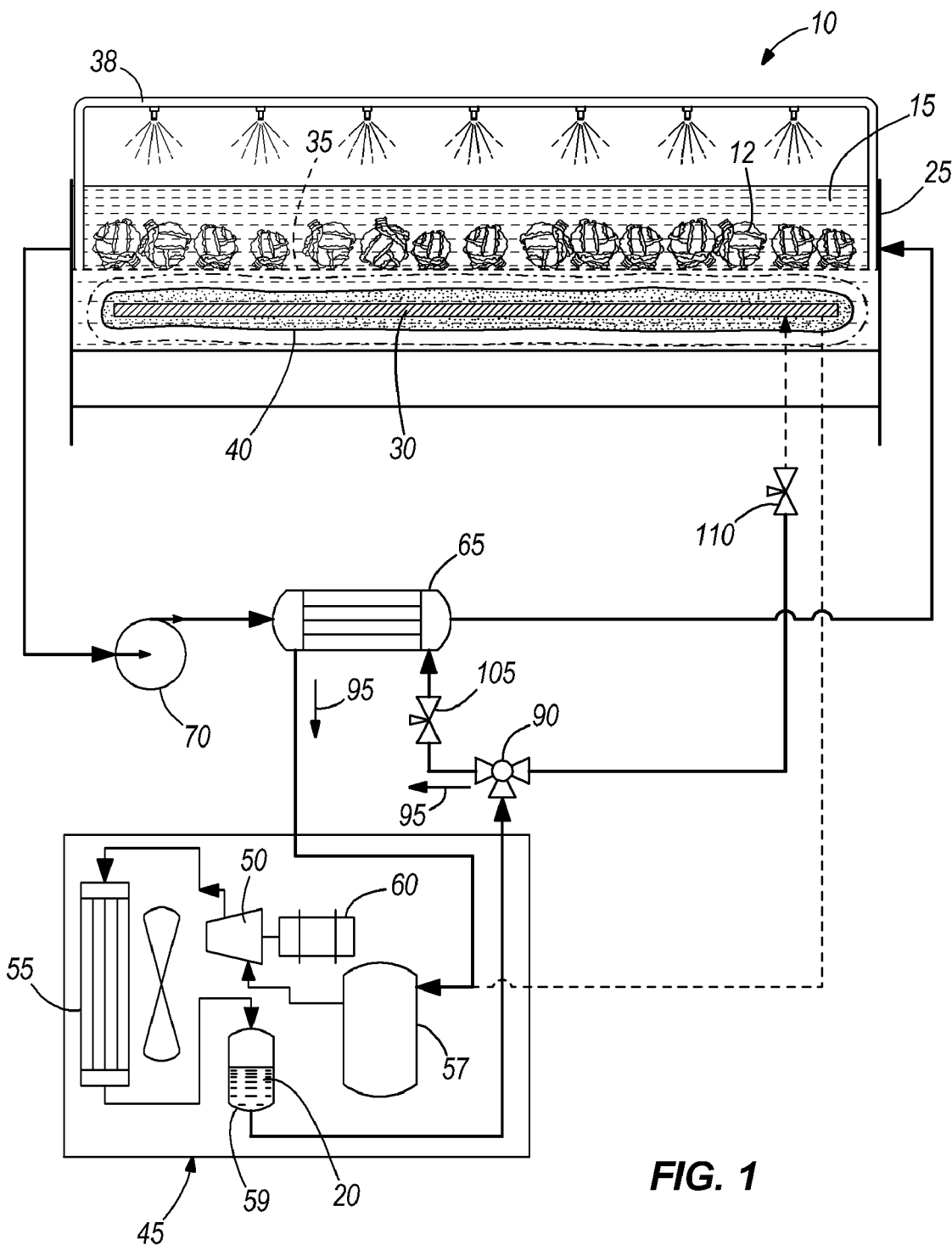
FIG. 1 is a schematic view of a hydrocooler system according to one embodiment of the present invention illustrating a first mode of operation of the hydrocooler system.
Figure 2:
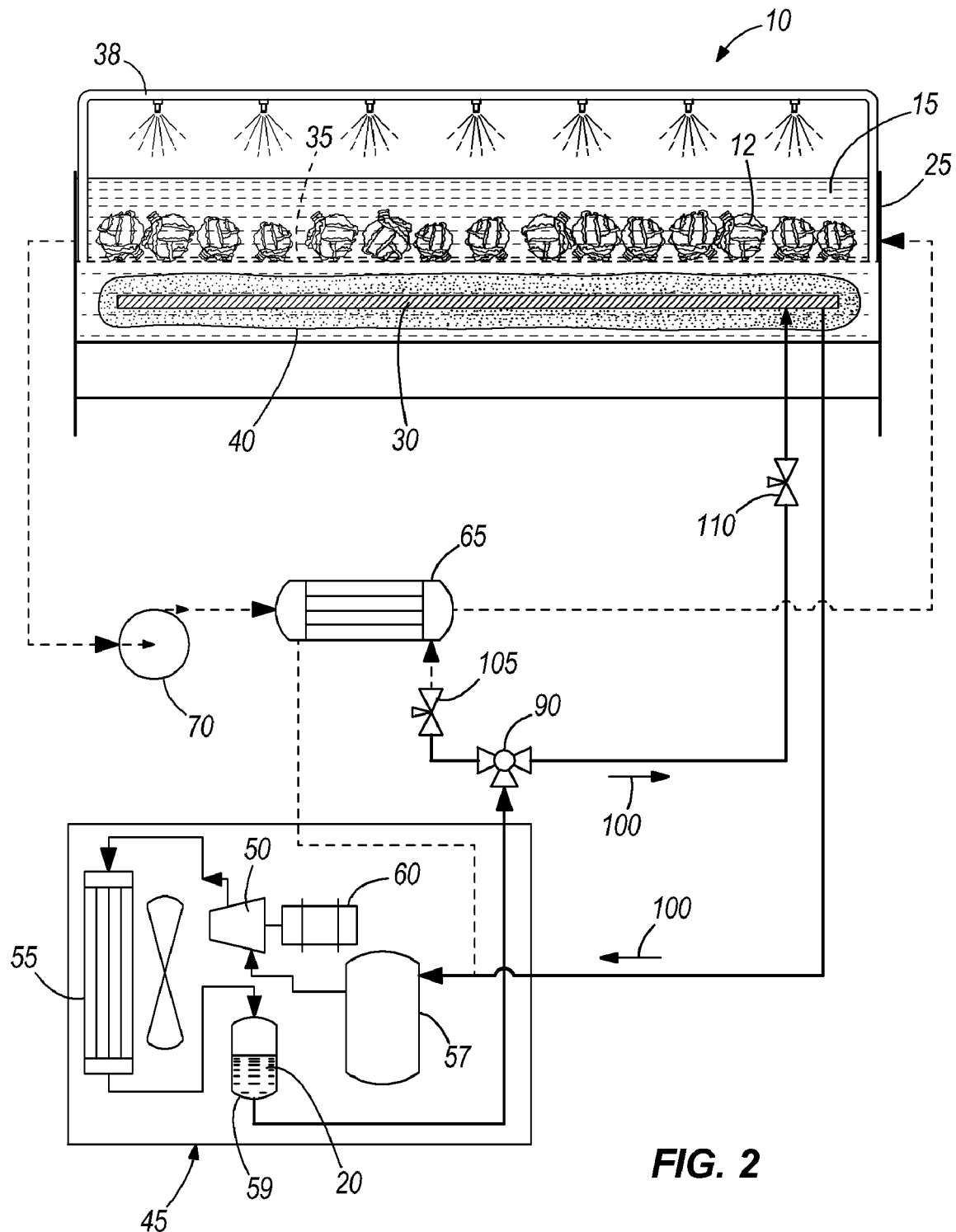
FIG. 2 is another schematic view of the hydrocooler system in FIG. 1 illustrating a second mode of operation of the hydrocooler system.

FIGS. 1 and 2 show a hydrocooler system 10 for cooling various products 12 (e.g., produce such as fruit and/or vegetables). The schematically illustrated hydrocooler system 10 has a compact and modular construction, which allows the hydrocooler system 10 to be easily assembled, cleaned and transported to various harvesting locations. In the harvesting locations, the produce can be picked or harvested, and then promptly placed in the hydrocooler system 10 providing the soonest possible opportunity to cool the produce. The produce can be placed in the hydrocooler system 10 by, for example, a user, a conveyor or a robotic device. The hydrocooler system 10 quickly cools the freshly harvested produce to a desired temperature adequate for storage and transportation of the produce. The hydrocooler system 10 utilizes a first fluid, water 15, to remove heat from the produce (i.e., cool the produce) and a second fluid, a refrigerant 20, to remove heat from the water 15 (i.e., cool the water 15).

With reference to FIGS. 1 and 2, the hydrocooler system 10 includes a hydrocooler tank 25 for containing the water 15 and a thermal storage device 30 for cooling the water 15 in the hydrocooler tank 25. In the illustrated construction, the hydrocooler tank 25 includes a shelf 35 for supporting the produce above the thermal storage device 30. In other constructions, the produce is maintained in the water 15 separate and away from the thermal storage device 30 using other devices (e.g., a basket, a net, etc.).

In the illustrated construction, the thermal storage device 30 is a plate evaporator capable of generating a thermal storage medium, ice 40, from the water 15, although in other constructions the thermal storage device 30 can be any type of evaporator (e.g., coil) capable of generating ice 40. In some constructions, the thermal storage device 30 is formed of multiple evaporators generating ice in the hydrocooler tank 25. The thermal storage device 30 is positioned in the hydrocooler tank 25 (FIGS. 1 and 2) and is submerged in the water 15 to generate the ice 40. The ice 40 is generated in response to the thermal storage device 30 receiving the refrigerant 20 from a condensing unit 45 of the hydrocooler system 10 (as shown in FIG. 2). The refrigerant 20 is directed through the thermal storage device 30 to cool the thermal storage device 30 and in doing so remove heat from the water 15 in which the thermal storage device 30 is submerged. As heat is removed from the water 15, the water 15 can change states (i.e., from liquid to solid) and thereby form the ice 40 on the outside of the thermal storage device 30.

The condensing unit 45 includes a compressor 50 and a condenser 55. The compressor 50 is driven by a motor 60 that is powered by a power source (not shown). In some constructions, the power source can be a battery or a portable generator. The condensing unit 45 also includes an accumulator tank 57 upstream of the compressor 50 and a receiver tank 59 downstream of the condenser 55. In other constructions, any conventional condensing unit can be used to remove heat from the refrigerant.

The hydrocooler system 10 further includes a fluid-cooler evaporator 65 for cooling the water 15 and a pump 70 for directing the water 15 from the hydrocooler tank 25 to the fluid-cooler evaporator 65. The fluid-cooler evaporator 65 is positioned in series with the hydrocooler tank 25 so that the water 15 can be cooled by the thermal storage device 30 and the fluid-cooler evaporator 65. The fluid-cooler evaporator 65 receives the refrigerant 20 from the condensing unit 45. The condensing unit 45 selectively communicates the refrigerant 20 to either the thermal storage device 30 or the fluid-cooler evaporator 65 to cool the water 15 in two separate locations in the hydrocooler system 10.

The pump 70 has an ON condition and an OFF condition. In the ON condition (FIG. 1), the pump 70 directs the water 15 from the hydrocooler tank 25, through the fluid-cooler evaporator 65 and then back to hydrocooler tank 25. In the OFF condition, the pump 70 stops the flow of the water 15 to the fluid-cooler evaporator 65 and instead maintains at least a portion of the water 15 in the hydrocooler tank 25.

With reference to FIGS. 1 and 2, the water 15 flows in a continuous loop through the hydrocooler system 10. Specifically, the water 15 flows from the hydrocooler tank 25 to the pump 70, from the pump 70 to the fluid-cooler evaporator 65, and from the fluid-cooler evaporator 65 to the hydrocooler tank 25. Thus, the hydrocooler tank 25, the fluid-cooler evaporator 65 and the thermal storage device 30 (positioned in the hydrocooler tank 25) are fluidly connected in series with one another.

The refrigerant 20 is directed or divided into two circulation loops by a three-way valve 90, which controls the flow of the refrigerant to either loop. A first circulation loop 95 (FIG. 1) directs the refrigerant 20 from the condensing unit 45, through the fluid-cooler evaporator 65 and then back to the condensing unit 45. A second circulation loop 100 (FIG. 2) directs the refrigerant 20 from the condensing unit 45, through the thermal storage device 30 and then back to the condensing unit 45. Two-way valves 105, 110 are positioned in each of the circulation loops 95, 100 of the fluid-cooler evaporator 65 and the thermal storage device 30, respectively.

The two-way valves 105, 110 are expansion valves that reduce the pressure of and control the amount of refrigerant flowing to the evaporators 65, 30.

The hydrocooler system 10 operates continuously in one of two modes: a first or harvesting mode (FIG. 1) in which the produce is cooled by the hydrocooler system 10 and a second or non-harvesting mode (FIG. 2) in which the hydrocooler system 10 generates the ice 40 for cooling the produce during the first mode (FIG. 1). By way of example, the hydrocooler system 10 can be operated in the first mode during the day or a harvesting period and in the second mode during the night or during non-harvesting periods.

As shown in FIG. 2, during the non-harvesting (second) mode of operation the thermal storage device 30 generates the ice 40 from the water 15 positioned in the hydrocooler tank 25. The pump 70 is in the OFF condition to stop or resist the flow of the water 15 through the continuous loop. Thus, the water 15 is substantially contained in the hydrocooler tank 25 and the thermal storage device 30 is submerged therein. In some cases, the pump 70 does not circulate the water 15 during the second mode of operation to enhance the generation of ice 40 from the water 15 on the thermal storage device 30. In another case, the hydrocooler system 10 operates in the second mode to take advantage of periods when the electrical power demand is generally at its lowest point (e.g., when not harvesting produce).

The three-way valve 90 resists or stops the flow of the refrigerant 20 from the condensing unit 45 to the fluid-cooler evaporator 65 and allows the condensing unit 45 to supply the refrigerant 20 to the thermal storage device 30. The refrigerant 20 flows through the thermal storage device 30 to cool the thermal storage device 30 and thereby remove heat from the water 15 contained in the hydrocooler tank 25. As heat is removed by the refrigerant 20, the water 15 in the hydrocooler tank 25, solidifies or freezes on the thermal storage device 30 thereby forming the ice 40. In the illustrated construction, the ice 40 forms around and is coupled to the thermal storage device 30. In other constructions, the ice 40 can separate from the thermal storage device 30 as determined by the construction of the thermal storage device 30. The ice 40 continues to build until the flow of the refrigerant 20 through the thermal storage device 30 stops (i.e., first mode of operation), or until the ice 40 reaches a maximum capacity as determined by various features of the hydrocooler system 10 (e.g., the size of hydrocooler tank 25, the amount of water 15, the conducting capabilities of the thermal storage device 30, the properties of the first fluid 15, etc.). Hereinafter, the capacity refers to the amount of heat that can be absorbed during rapid loading of the produce into the hydrocooler system 10.

As shown in FIG. 1, during the harvesting (first) mode of operation the ice 40 and the fluid-cooler evaporator 65 cool the water 15, which cools the harvested produce. The produce is harvested and then saturated by the water 15 so as to cool the produce. The produce can be saturated by immersing the produce in the water 15, as shown in FIGS. 1 and 2, by spraying the water 15 on the produce, or by a combination of immersing and spraying the produce. Referring to FIGS. 1 and 2, the produce is placed in the hydrocooler tank 25 and is saturated by the water 15 contained within the hydrocooler tank 25. In the case of spraying the produce, a sprayer 38 is in fluid communication with the hydrocooler tank 25 and draws the water 15 from the hydrocooler tank 25 and then saturates the produce. To spray the produce, the produce can be positioned inside of the hydrocooler tank 25.

When the hydrocooler system 10 is in the first mode of operation, the pump 70 is in the ON condition and circulates the water 15 along the continuous loop through the hydrocooler tank 25 and the fluid-cooler evaporator 65, which continuously cools or removes heat from the water 15. The three-way valve 90 resists or stops the flow of the refrigerant 20 from the condensing unit 45 to the thermal storage device 30 and allows the condensing unit 45 to supply the refrigerant 20 to the fluid-cooler evaporator 65. The water 15 is drawn from the hydrocooler tank 25 by the pump 70 at a first temperature and pumped into the fluid-cooler evaporator 65. The refrigerant 20 is directed through the fluid-cooler evaporator 65 and thereby removes heat from the water 15 being pumped through the fluid-cooler evaporator 65 by the pump 70. As the water 15 exits the fluid-cooler evaporator 65, the water 15 is at a second temperature, which is less than the first temperature. The water 15 is then directed into the hydrocooler tank 25 to complete the continuous loop of the hydrocooler system 10. The water 15 absorbs or removes heat from the produce in the hydrocooler system 10. As the water 15 cools the produce, the ice 30 concurrently cools the water 15, which increases the capacity of the water 15. In other words, the water 15 and therein the produce are cooled by the fluid-cooler evaporator 65 and the ice 40. As heat is removed from the water 15 and absorbed by the ice 40, the capacity of the ice 40 begins to decrease and the ice 40 melts and decreases in size (illustrated in FIG. 1) until the ice 40 has zero capacity or has completely transformed back into the water 15. Once the ice 40 is depleted (i.e., has zero capacity), the water 15 and the produce are cooled exclusively by the fluid-cooler evaporator 65.

Figure 3:
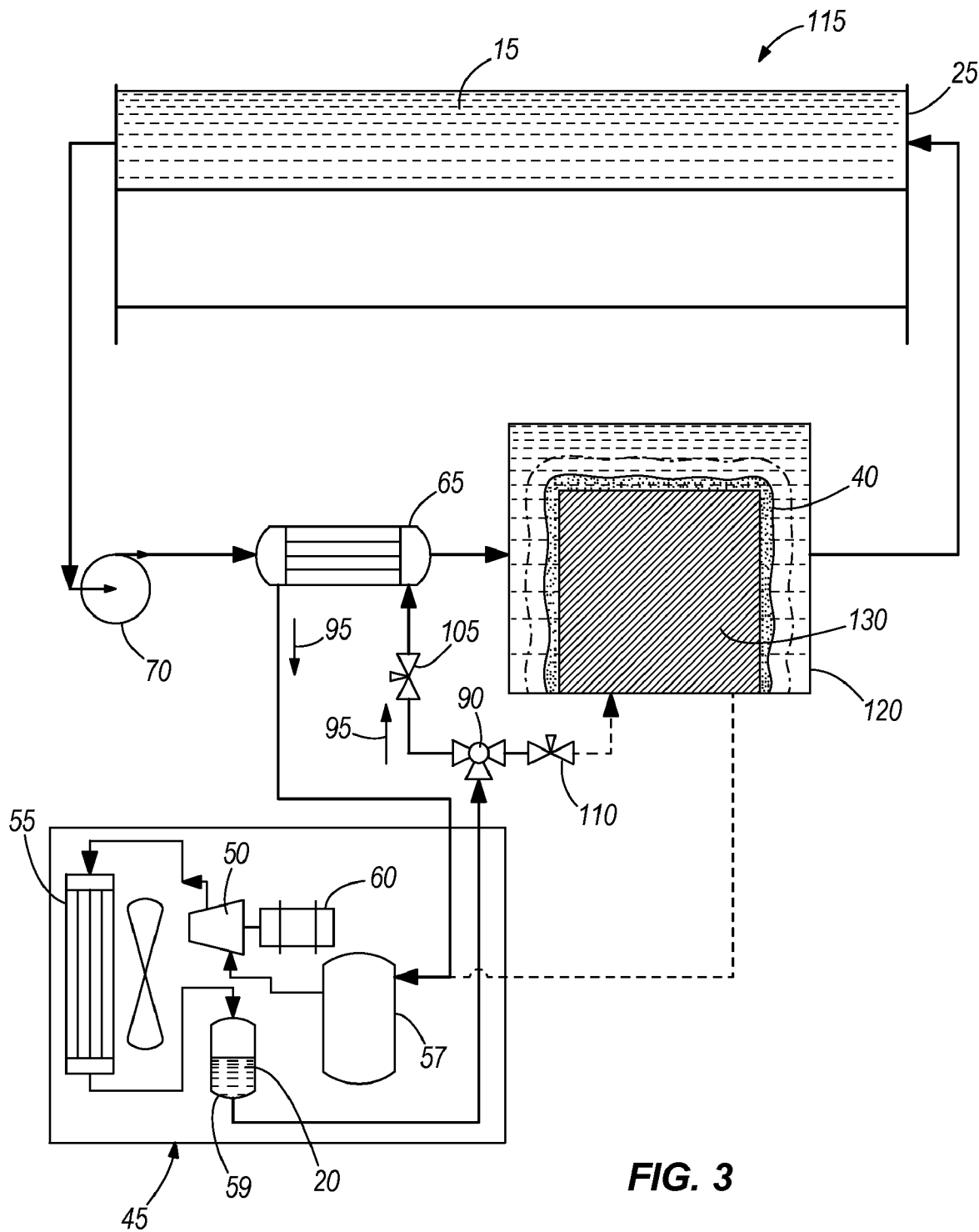
FIG. 3 is a schematic view of a hydrocooler system according to another construction of the present invention illustrating a first mode of operation of the hydrocooler system.
Figure 4:
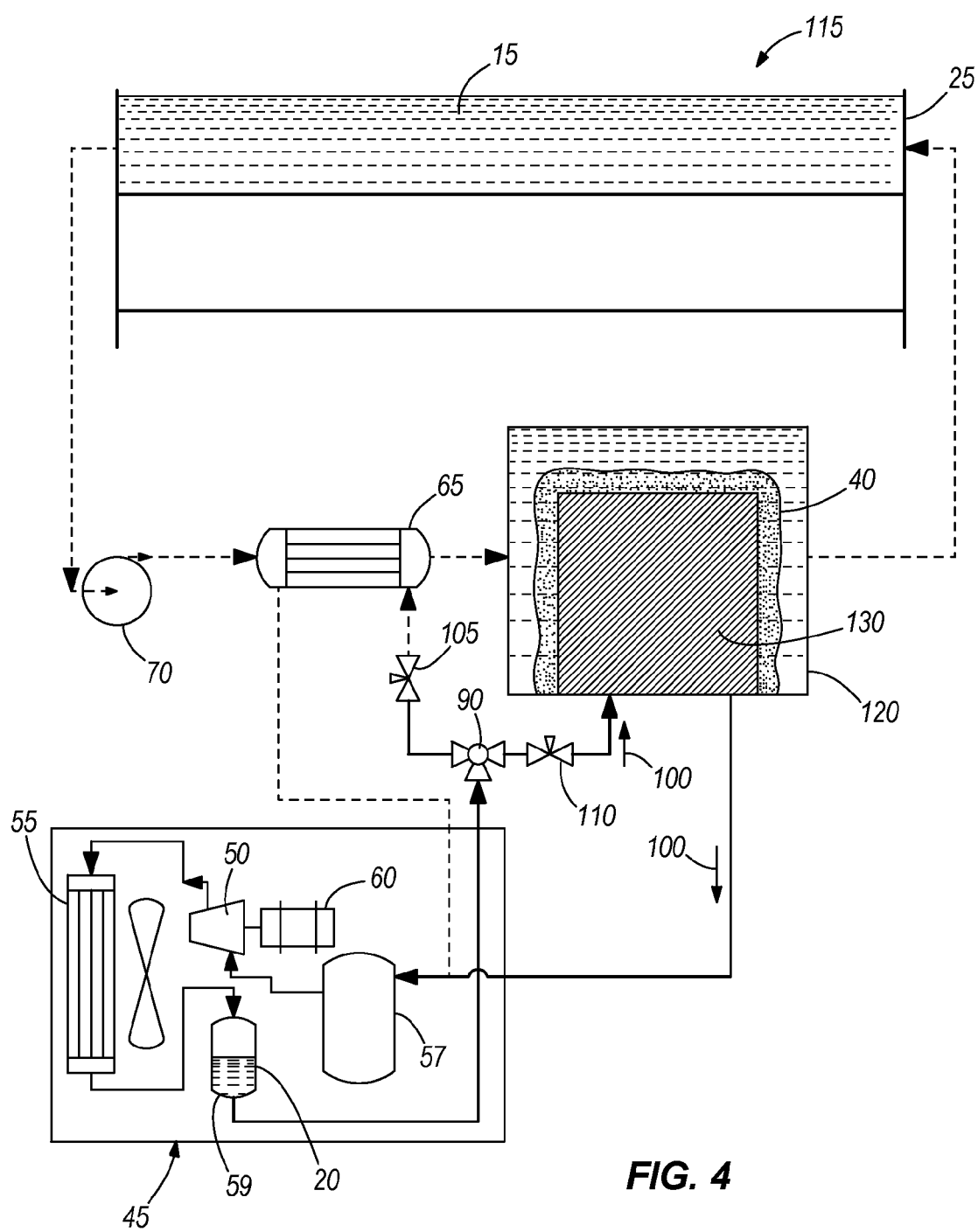
FIG. 4 is another schematic view of the hydrocooler system in FIG. 3 illustrating a second mode of operation of the hydrocooler system.

FIGS. 3 and 4 show a hydrocooler system 115 according to another construction of the invention. The hydrocooler system 115 shown in FIGS. 3 and 4 is similar to the hydrocooler system 10 shown in FIGS. 1 and 2; therefore, like structure will be identified by the same reference numerals. The hydrocooler system 115 includes a thermal storage device 130 positioned in a thermal storage tank 120, which is separate from the hydrocooler tank 25. The thermal storage tank 120 contains the water 15 and the thermal storage device 130 is submerged in the water 15 of the thermal storage tank 120. In the illustrated construction, the thermal storage tank 120 and the thermal storage device 30 are positioned between the fluid-cooler evaporator 65 and the hydrocooler tank 25. The water 15 flows from the fluid-cooler evaporator 65 to the thermal storage tank 120 and then from the thermal storage tank 120 to the hydrocooler tank 25. Thus, the hydrocooler tank 25, the fluid-cooler evaporator 65 and the thermal storage device 30 (positioned in the thermal storage tank 120) are fluidly connected in series with one another.

As shown in FIG. 4, during the non-harvesting (second) mode of operation, the thermal storage device 130 generates the ice 40 from the water 15 positioned in the thermal storage tank 120. The condensing unit 45 directs the refrigerant through the thermal storage device 130 to cool the thermal storage device 130 and thereby remove heat from the water 15 contained in the thermal storage tank 120. As heat is removed by the refrigerant 20, the water 20 in the thermal storage tank 120, solidifies or freezes on the thermal storage device 130 thereby forming the ice 40.

During the harvesting (first) mode of operation (FIG. 3), the ice 40 positioned in the thermal storage tank 120 and the fluid-cooler evaporator cool the water 15, which cools the harvested produce. The produce is harvested and then saturated by the water 15 so as to cool the produce. The produce can be saturated by immersing the produce in the water 15 and/or by spraying the water 15 on the produce.

When the hydrocooler system 115 is in the first mode of operation, the pump 70 is in the ON condition and circulates the water 15 along the continuous loop through the hydrocooler tank 25, the fluid-cooler evaporator 65, and the thermal storage tank 120. The water 15 is drawn from the hydrocooler tank 25 by the pump 70 at a first temperature and pumped into the fluid-cooler evaporator 65. The refrigerant 20 is directed through the fluid-cooler evaporator 65 and thereby removes heat from the water 15 being pumped through the fluid-cooler evaporator 65 by the pump 70. As the water 15 exits the fluid-cooler evaporator 65, the water 15 is at a second temperature, which is less than the first temperature. The water 15 is then directed into the thermal storage tank 120 where the water 15 is additionally cooled by the ice 40. The water 15 exits the thermal storage tank 120 at a third temperature, which is less than the second temperature. Then, the water 15 is directed back to the hydrocooler tank 25 to complete the continuous loop of the hydrocooler system 115. The water 15 absorbs or removes heat from the produce in the hydrocooler system 115 and then the water 15 is drawn from the hydrocooler tank 25 to be cooled again by the fluid-cooler evaporator 65 and the ice 40 positioned in the thermal storage tank 120. As heat is removed from the water 15 and absorbed by the ice 40, the capacity of the ice 40 begins to decrease and the ice 40 melts until the ice 40 has zero capacity or has completely transformed back into the water 15. Once the ice 40 is depleted (i.e., has zero capacity), the water 15 and the produce are cooled exclusively by the fluid-cooler evaporator 65.

The condensing unit 45 can be run continuously in both the first and second modes of the hydrocooler system 10, 115 to effectively increase the cooling and loading capacity of the hydrocooler system 10, 115 during operation in the first mode. For example, by running the system continuously through both the first and second modes, a 3-ton condensing unit can perform an equivalent of 5 tons of cooling during operation in the first mode. The 2-ton difference represents the cooling capacity of the thermal storage device 30, 130 (i.e., the thermal storage device 30, 130 can be sized such that it can handle the difference between the continuous capacity demand of the produce when the system is operating in the first mode and the capacity of the condensing unit 45). In this way, the system can be designed to run continuously at peak efficiency, instead of the less efficient on/off or partly load setting, and can also be a significant advantage when electrical power capacity is limited at the site. In this manner, a condensing unit can be used which has a capacity less than the demanding load of the produce.

Another advantage, for example, of continuously operating the hydrocooler system 10, 115 is that the hydrocooler system 10, 115 is operated at higher thermal efficiencies than compared to non-continuous operation. The peak thermal efficiency when run continuously is greater than the thermal efficiency of stopping/starting operation. In other cases, the use of the thermal storage device 30, 130 increases the thermal capacity to allow the hydrocooler system 10, 115 to handle "hot" produce loaded into the hydrocooler system 10, 115. For example, when the produce is harvested and placed in the hydrocooler system 10, 115, the produce quickly rejects heat to the water 15 due to the large temperature difference between the produce and the water 15. Damages caused by overwhelming the hydrocooler system 10, 115 with this sudden loading (i.e., temperature difference or heat rejection) are prevented because the ice 40 acts as a thermal reservoir. Any increases of temperature in the water 15 caused by "hot" produce will result in the ice 40 absorbing the majority of the heat. Thus, the hydrocooler system 10, 115 resists any significant rise of temperature for the water 15 in the hydrocooler tank 25.

Although the invention has been described in detail with reference to certain preferred embodiments, variations and modifications exist within the scope and spirit of one or more independent aspects of the invention as described.

What is claimed is:

1. A hydrocooler system for cooling produce, the hydrocooler system comprising:
   a hydrocooler tank configured to contain a fluid used to saturate and cool the produce;
   a thermal storage device positioned in the hydrocooler tank and configured to receive a refrigerant, the thermal storage device is configured to generate a thermal storage medium from the fluid on the thermal storage device in response to the flow of refrigerant through the thermal storage device; and
   an evaporator fluidly connected in series with the hydrocooler tank and the thermal storage device, the evaporator configured to be in thermal communication with the fluid.

2. The hydrocooler system of claim 1, further comprising a condensing unit for supplying the refrigerant to the thermal storage device.

3. The hydrocooler system of claim 1, further comprising a pump in fluid communication with the hydrocooler tank, wherein the pump is configured to circulate the fluid.

4. The hydrocooler system of claim 1, wherein the hydrocooler tank is configured to allow submersion of the produce in the fluid.

5. The hydrocooler system of claim 1, further comprising a sprayer in fluid communication with the hydrocooler tank, the sprayer configured to spray the fluid on the produce positioned inside of the hydrocooler tank.

6. The hydrocooler system of claim 1, wherein the thermal storage device includes an evaporator.

7. The hydrocooler system of claim 1, wherein during the first mode of operation the fluid is configured to flow from the hydrocooler tank, through the evaporator to initially cool the fluid, then back to the hydrocooler tank such that the thermal storage device additionally cools the fluid.

8. A hydrocooler system for cooling produce, the hydrocooler system comprising:
   a hydrocooler tank configured to contain a fluid used to saturate and cool produce;
   an evaporator fluidly connected to the hydrocooler tank and configured to be in thermal communication with the fluid;
   a thermal storage device fluidly connected to the hydrocooler tank and to the evaporator such that the hydrocooler tank, the evaporator and the thermal storage device are fluidly connected in series with one another, the thermal storage device configured to receive a refrigerant and is configured to be in thermal communication with the fluid; and
   a condensing unit configured to supply the refrigerant to the thermal storage device and to the evaporator, the refrigerant operable to remove heat from the fluid during a first mode of operation and a second mode of operation,
   wherein during the first mode of operation the condensing unit supplies the refrigerant to the evaporator to remove heat from the fluid and during the second mode of operation the condensing unit supplies the refrigerant to the thermal storage device to generate a thermal storage medium from the fluid on the thermal storage device in response to removing heat from the fluid.

9. The hydrocooler system of claim 8, wherein the thermal storage device is positioned in the hydrocooler tank.

10. The hydrocooler system of claim 8, wherein the thermal storage device is positioned in a thermal storage tank fluidly connected to the hydrocooler tank and the evaporator, the thermal storage tank configured to contain the fluid, and wherein the thermal storage device is submerged in the fluid.

11. The hydrocooler system of claim 8, wherein during the first mode of operation the fluid is configured to flow from the hydrocooler tank, through the evaporator to initially cool the fluid, then through the thermal storage device to additionally cool the fluid and back to the hydrocooler tank.

12. The hydrocooler system of claim 11, further comprising a pump for circulating the fluid through the hydrocooler tank, the evaporator and the thermal storage device during the first mode of operation.

13. The hydrocooler system of claim 12, wherein the pump does not circulate the fluid during the second mode of operation to enhance the generation of thermal storage medium from the fluid on the thermal storage device.

14. A method of cooling produce, the method comprising:
   positioning a hydrocooler tank, an evaporator and a thermal storage device in series and in fluid communication with one another;
   circulating fluid from the hydrocooler tank, to the evaporator, then to the thermal storage device and back to the hydrocooler tank, the evaporator and the thermal storage device in thermal communication with the fluid;
   supplying refrigerant from a condensing unit to the evaporator in a first mode of operation and to the thermal storage device in a second mode of operation;
   generating a thermal storage medium on the thermal storage device from the fluid in response to the thermal storage device receiving the supply of the refrigerant during the second mode of operation, the refrigerant operable to remove heat from the fluid circulated to the thermal storage device; and
   directing the fluid to the evaporator to remove heat from the fluid and then directing the fluid to the thermal storage device to directly contact the thermal storage medium to remove heat from the fluid in the first mode of operation, the fluid from within the hydrocooler tank used to cool produce.

15. The method of claim 14, circulating the fluid from the hydrocooler tank, to the evaporator and then to the thermal storage device during the first mode of operation and not the second mode of operation.

16. The method of claim 14, further comprising positioning the thermal storage device within the hydrocooler tank, and submerging the thermal storage device in the fluid within the hydrocooler tank.

17. The method of claim 14, further comprising positioning the thermal storage device within a thermal storage tank fluidly connected to the hydrocooler tank, and submerging the thermal storage device in the fluid within the thermal storage tank.

18. The method of claim 14, further comprising spraying the produce with the fluid from the hydrocooler tank to saturate and cool the produce.

19. The method of claim 14, further comprising positioning the produce in the hydrocooler tank and submerging the produce in the fluid contained in the hydrocooler tank to saturate and cool the produce.

* * * * *